US009366164B2

(12) United States Patent
Matsuo et al.

(10) Patent No.: US 9,366,164 B2
(45) Date of Patent: Jun. 14, 2016

(54) DPF SYSTEM FOR AN ENGINE GENERATOR

(71) Applicant: Denyo Co., Ltd., Tokyo-to (JP)

(72) Inventors: Seiji Matsuo, Fukui-ken (JP); Yasuhiro Kobayashi, Danville, KY (US); Shinji Matsuda, Danville, KY (US); Tadahiro Fujita, Fukui-ken (JP)

(73) Assignee: DENYO CO., LTD., Tokyo-To (JP)

(*) Notice: Subject to any disclaimer, the term of this patent is extended or adjusted under 35 U.S.C. 154(b) by 0 days.

(21) Appl. No.: 14/217,868

(22) Filed: Mar. 18, 2014

(65) Prior Publication Data

US 2015/0033716 A1    Feb. 5, 2015

(30) Foreign Application Priority Data

Jul. 31, 2013   (JP) .................. 2013-159627

(51) Int. Cl.
  *F01N 3/00* (2006.01)
  *F01N 3/023* (2006.01)
  (Continued)

(52) U.S. Cl.
  CPC .............. *F01N 3/0234* (2013.01); *F01N 3/023* (2013.01); *F01N 9/002* (2013.01); *F02D 41/029* (2013.01); *F01N 2430/00* (2013.01); *F01N 2590/10* (2013.01); *F01N 2900/1404* (2013.01); *F02B 63/04* (2013.01); *F02D 2041/026* (2013.01); *Y02T 10/47* (2013.01)

(58) Field of Classification Search
  CPC ..... F01D 41/029; F01N 9/002; F01N 3/0842; F01N 3/035; F01N 13/02
  USPC ................... 60/274, 285, 286, 295, 297, 311
  See application file for complete search history.

(56) References Cited

U.S. PATENT DOCUMENTS 6,422,001 B1 * 7/2002 Sherman et al. ............... 60/274
8,816,651 B1 * 8/2014 Fell ............................. 322/21
(Continued)

FOREIGN PATENT DOCUMENTS

DE    4239357 C1    12/1993
DE    4239357 C1 *  12/1993   ............. F01N 3/02
(Continued)

OTHER PUBLICATIONS

Extended Search Report of Dec. 5, 2014 issued to the corresponding European patent application.
(Continued)

*Primary Examiner* — Patrick Maines
(74) *Attorney, Agent, or Firm* — Jacobson Holman, PLLC.

(57) ABSTRACT

A DPF system for an engine generator that performing a recovery process on a filter (DPF) provided to remove particulate matter generated by combustion of fuel when an amount of the particulate matter in the DPF exceeds a predetermined value, the engine generator performing the recovery process by carrying out an automatic recovery operation to raise a temperature of exhaust gas to combust the particulate matter, the system comprising: a dummy load connected to the engine generator when necessary; and control device for allowing the engine to perform a recovery preparation operation in such a manner that, once the amount of the particulate matter exceeds the predetermined value, the recovery operation is performed when the temperature of exhaust gas reaches a reference temperature, and the dummy load is connected to the generator to raise the temperature of exhaust gas when the temperature thereof fails to reach the reference temperature.

5 Claims, 7 Drawing Sheets

(51) Int. Cl.
*F02D 41/02* (2006.01)
*F01N 9/00* (2006.01)
*F02B 63/04* (2006.01)

(56) References Cited

U.S. PATENT DOCUMENTS

| | | | | |
|---|---|---|---|---|
| 2009/0044520 | A1* | 2/2009 | Farell et al. | 60/295 |
| 2009/0113874 | A1* | 5/2009 | McKee | 60/272 |
| 2011/0257821 | A1* | 10/2011 | Beaucaire et al. | 701/22 |
| 2013/0204476 | A1* | 8/2013 | Zink et al. | 701/22 |

FOREIGN PATENT DOCUMENTS

| | | | |
|---|---|---|---|
| DE | 102004063181 | A1 | 7/2006 |
| DE | 102007015875 | A1 | 10/2008 |
| EP | 1205647 | A1 | 5/2002 |
| EP | 1319812 | A1 | 6/2003 |
| EP | 1319812 | A1 * | 6/2003 |
| JP | 2002-195024 | A | 7/2002 |
| JP | 2002195024 | A * | 7/2002 |
| JP | 2006-274844 | A | 10/2006 |
| JP | 2007-112331 | A | 5/2007 |
| JP | 2007187029 | A * | 7/2007 |
| JP | 2009-216075 | A | 9/2009 |
| JP | 2011-132836 | A | 7/2011 |
| JP | 2011132836 | A * | 7/2011 |
| JP | 2011-149365 | A | 8/2011 |
| JP | 2011-247133 | A | 12/2011 |
| WO | WO 2008119589 | A1 * | 10/2008 |

OTHER PUBLICATIONS

Japanese Office Action of Jul. 31, 2015 issued to the corresponding Japanese patent application.

* cited by examiner

DPF SYSTEM FOR AN ENGINE GENERATOR

BACKGROUND OF THE INVENTION

1. Field of the Invention

The present invention relates to an exhaust gas treatment filter for an engine generator, and in particular, to a system that removes particulate matter (PM) generated by operation of a diesel engine for a generator and accumulated in a Diesel Particulate Filter (DPF) to recover the DPF.

2. Related Art

A diesel engine generates particulate matter in addition to NOx as a result of fuel combustion in nature. To prevent the particulate matter from being emitted into the atmosphere, an increasing number of diesel engines are equipped with a DPF to collect particulate matter (PM) contained in exhaust gas. This also applies to engine-driven generators.

In an engine-driven generator equipped with a DPF, a generator G is driven by a diesel engine E, electric power is supplied to a load (not shown in the drawings) through an output terminal OUT, and exhaust gas from the diesel engine E is emitted into the atmosphere through the DPF, as shown in FIG. 5.

However, the DPF is limited in terms of the amount of PM collected, and thus, once a certain amount of particulate matter is accumulated, the particulate matter needs to be removed by, for example, being burned by a certain method, to recover the DPF. For recovery of the DPF, the amount of the particulate matter and the temperature of the exhaust gas are measured and the engine E is controlled to burn the particulate matter.

That is, particulate matter amount measuring device PMD provided in the DPF measures the amount of the particulate matter, and temperature detecting device TD measures the exhaust gas temperature. Based on the results of measurements by the measuring device, an engine control unit ECU transmits and receives signals to and from the engine E to control the engine E. Thus, the particulate matter is burned in a timely manner to recover the DPF.

Furthermore, another method for recovering the DPF is to burn the particulate matter using an electric heater incorporated in the DPF (see Japanese Patent Laid-Open No. 2009-216075).

The recovery of the DPF as described above allows an engine generator using a diesel engine to be continuously operated. A failure to appropriately recover the DPF causes a large amount of particulate matter to be accumulated. This leads to a very disadvantageous situation that involves the shutdown of the generator and manual removal of the particulate matter in the DPF.

To recover the DPF, in other words, to burn the particulate matter, the exhaust gas needs to be hot above a certain temperature. In this case, what should be taken into account is that the installed engine generator typically has a capacity about three times as large as a rated input power for a load so as to be able to deal with, for example, starting of an electric motor when a large starting current flows rapidly.

Thus, in a steady state, the engine is operated under a light load, and the exhaust gas temperature remains low. Since the generator serves as a load on the engine, the engine is to be operated at a constant speed. Consequently, such method of increasing the speed in order to raise the exhaust gas temperature as is the case with automobiles cannot be adopted.

Therefore, the recovery of the DPF in the engine generator may involve a technique for burning the particulate matter using such a heater as illustrated in Japanese Patent Laid-Open No. 2009-216075.

However, providing a heater in order to burn the particulate matter is not always satisfactory from the viewpoint of fuel efficiency. Furthermore, a special DPF incorporating the heater is not preferable. Instead of the special DPF, a general-purpose DPF (for example, a DPF for automobiles) is desirably used, but adopting the general-purpose DPF for the engine generator is inappropriate as described above.

With the foregoing in view, it is an object of the present invention to provide a DPF system for an engine generator which prevents particulate matter from being accumulated without stopping power supply and which allows the DPF to be recovered in a fuel efficient manner.

SUMMARY OF THE INVENTION

To accomplish this object, the present invention provides:

A DPF system for an engine generator that carries out a recovery process on a filter (DPF) provided to remove particulate matter generated by combustion of fuel for an engine when an amount of the particulate matter attached to the DPF exceeds a predetermined value, the engine generator carrying out the recovery process by performing an automatic recovery operation to raise a temperature of exhaust gas from the engine to burn the particulate matter, the DPF system comprising:

a dummy load connected to the engine generator when necessary; and control device for allowing the engine to perform an automatic recovery preparation operation in such a manner that, once the amount of the particulate matter exceeds the predetermined value, the automatic recovery operation is performed when the temperature of exhaust gas reaches an automatic recovery reference temperature, and the dummy load is connected to the generator to raise the temperature of exhaust gas when the temperature of exhaust gas does not reach the automatic recovery reference temperature.

As described above, according to the present invention, when the amount of particulate matter in the engine increases, the dummy load is connected to the generator based on the exhaust gas temperature to raise the exhaust gas temperature. Thus, the particulate matter is burned to recover the DPF. This prevents an excessive amount of particulate matter from being accumulated and furthermore allows provision of a DPF system for an engine generator which has high fuel efficiency. As a result, the engine generator can be operated without bringing about a situation in which power supply is stopped and in which the DPF is then recovered.

DETAILED DESCRIPTION OF THE INVENTION

Embodiments of the present invention will be described with reference to the accompanying drawings as follows.

Embodiment 1

Figure 1:
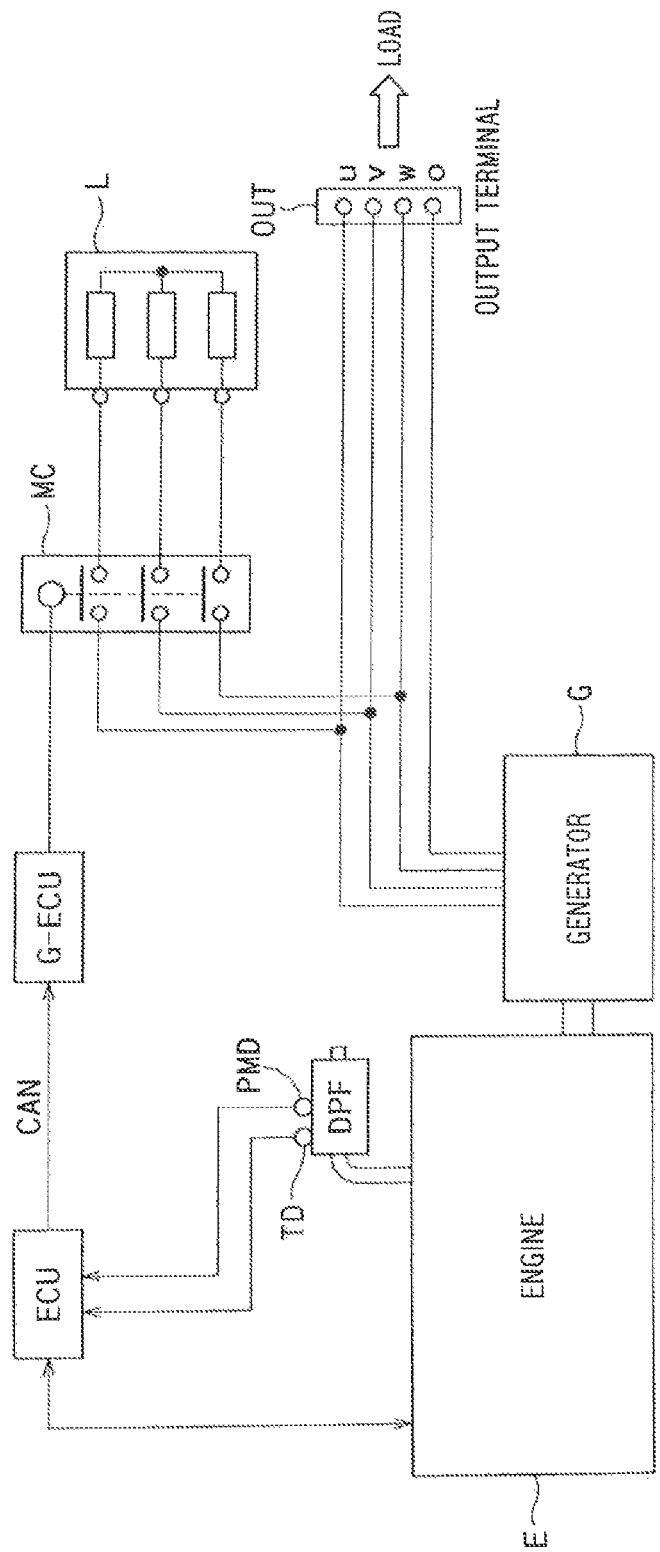
FIG. 1 is a block diagram showing a configuration of a DPF system for an engine generator according to the present invention.

FIG. 1 is a block diagram showing a configuration of an embodiment of the present invention. As shown in FIG. 1, a generator G includes a dummy load L and a contactor MC both provided on an output side of the generator G; the contactor MC applies the dummy load L on the generator G and removes the dummy load L. The contactor MC is turned on and off to connect the dummy load L such as a resistor to the generator G when necessary. The generator G is then operated to increase power output from the engine E.

Based on results of measurements by particulate matter amount measuring device PMD and temperature measuring device TD, the contactor MC is controlled by an engine controlling additional unit G-ECU connected to an engine control unit ECU via a CAN (Controller Area Network). That is, the engine controlling additional unit G-ECU turns the contactor MC on and off in accordance with engine control performed by the engine control unit ECU to controllably apply the dummy load L on the generator G and cuts off the dummy load L.

That is, when necessary, the dummy load L is connected to the generator G to increase the power output from the engine E to raise the temperature of exhaust gas. Thus, particulate matter in a DPF is burned and removed to recover the DPF.

In this case, the engine control unit ECU is, for example, a control apparatus attached to an automobile diesel engine E. The engine controlling additional unit G-ECU is a control apparatus added in order to control the contactor MC so as to apply the dummy load L to the engine E and to cut off the dummy load in accordance with operation of the engine E.

Figure 2:
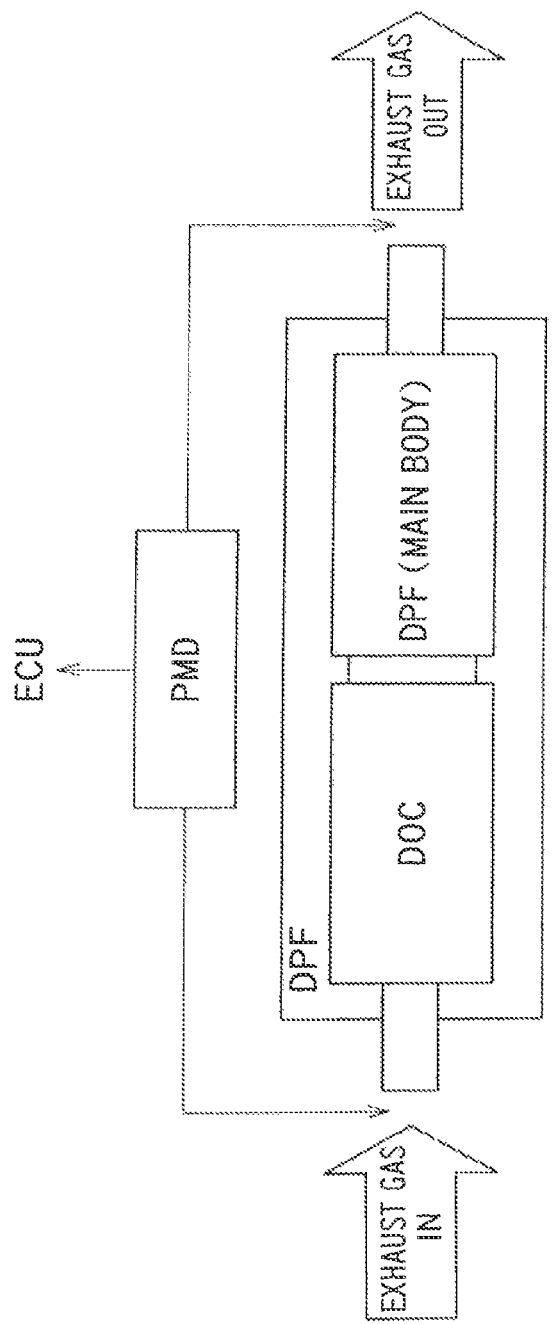
FIG. 2 is a diagram illustrating a configuration of a DPF installed in the engine generator.

FIG. 2 illustrates the structure of the DPF. The DPF in a broad sense consists of an oxidation catalyst DOC and a DPF main body that is the DPF in a narrow sense. The DOC and the DPF main body integrally operate to treat exhaust gas IN to generate exhaust gas OUT. Then, the particulate matter amount measuring device PMD detects the amount of particulate matter based on, for example, a difference in pressure between an input and an output of the DPF.

Figure 3A:
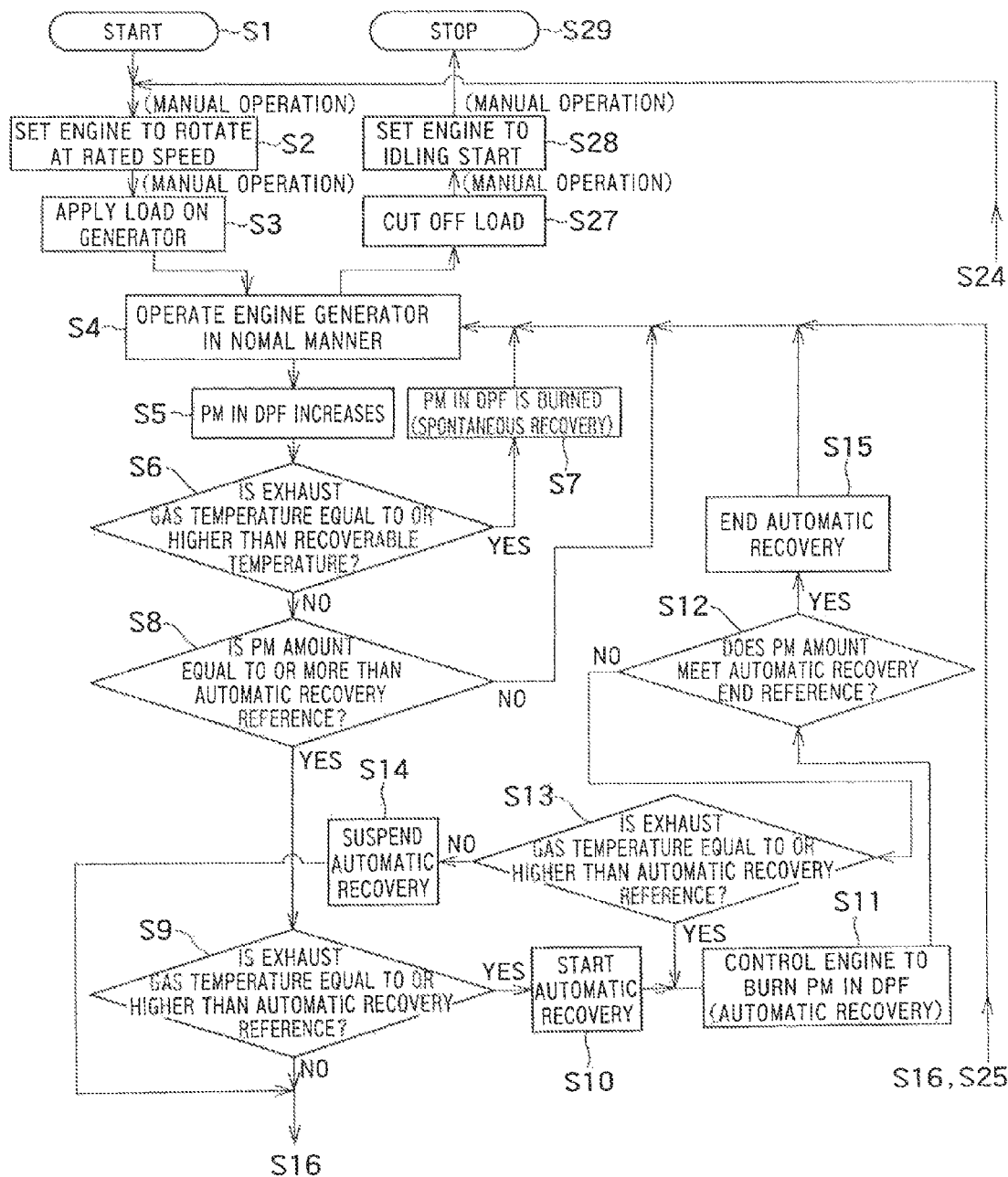
FIG. 3 is a flowchart showing a basic control operation for recovery of the DPF in the engine generator comprising FIGS. 3A and B.
Figure 3B:
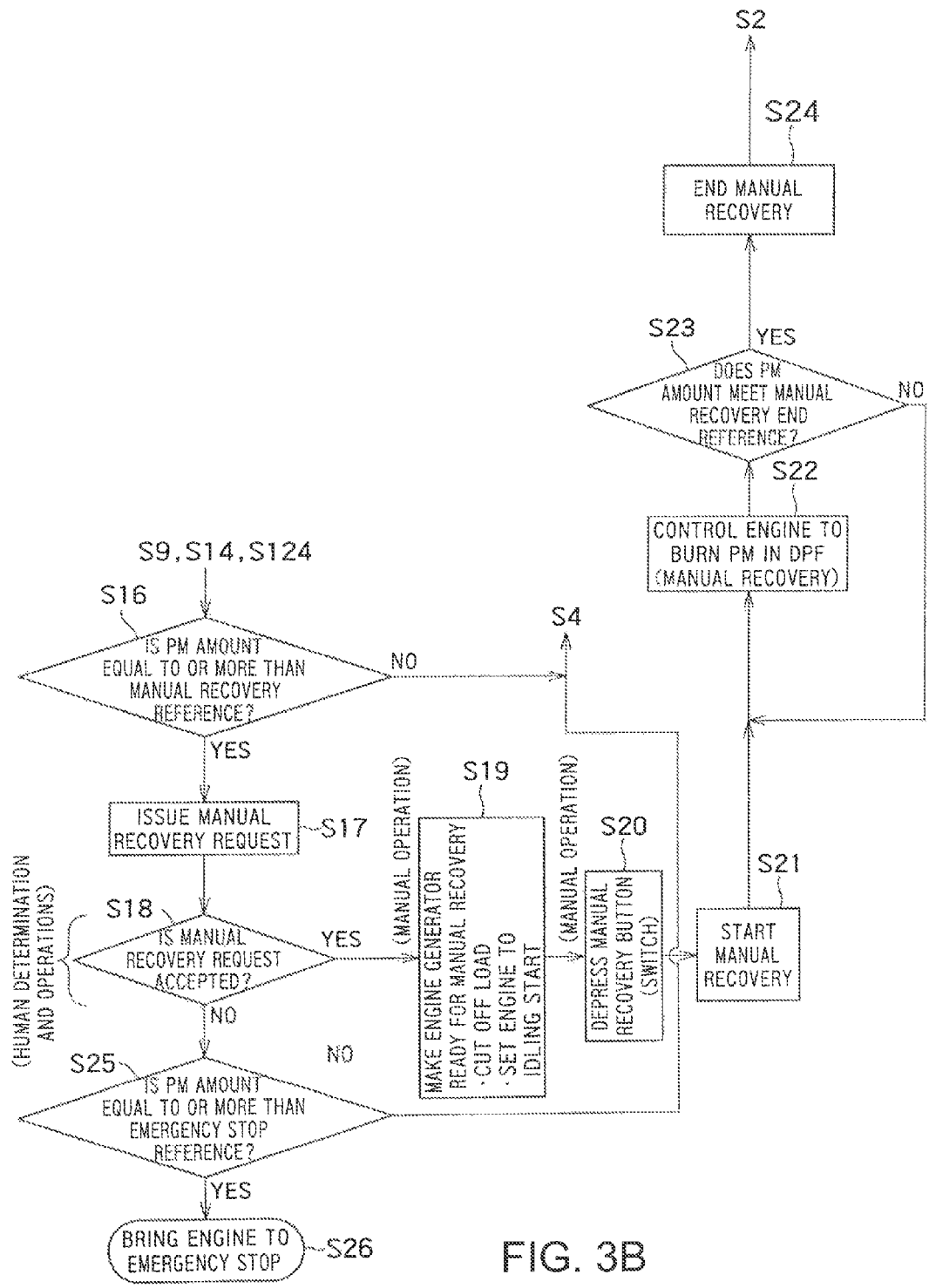
Figure 5:
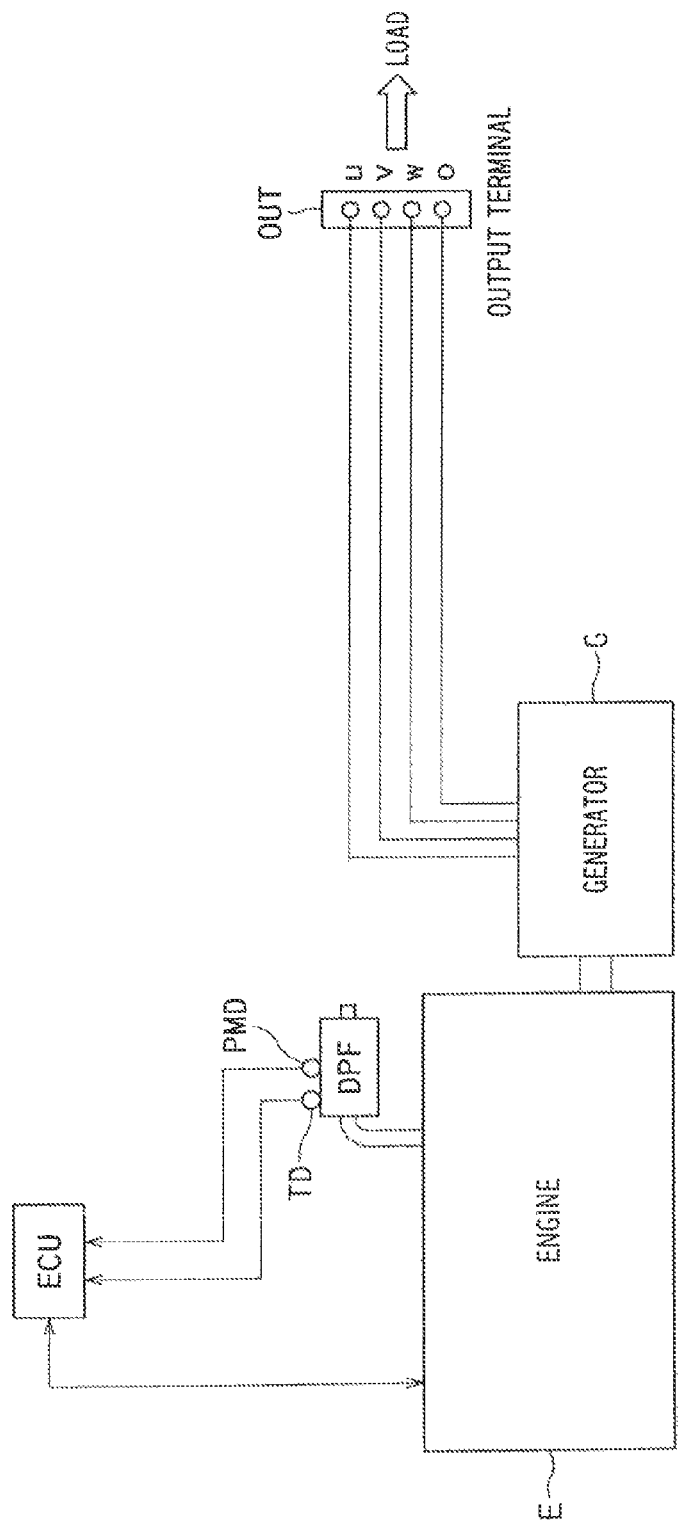
FIG. 5 is a block diagram showing a configuration of a DPF system in a conventional engine generator.

FIG. 3 is a flowchart showing a basic operation of DPF recovery control in the engine generator shown in FIG. 5, that is, the operation corresponding to a prerequisite for the present invention. With reference to FIG. 3, description will be provided which relates to a normal operation and a DPF recovery operation of an engine generator equipped with a DPF system.

Normal Operation and DPF Recovery Operation of the Engine Generator Equipped with the DPF System First, an operator performs manual operations of starting the engine E (S1), setting the engine E to rotate at a rated speed (S2), and applying a load on the generator G (S3). Thereby, the engine generator performs a normal operation (S4).

As the engine E is operated, particulate matter is generated in exhaust gas and gradually accumulated in the DPF (S5). At this time, when the exhaust gas temperature in the engine E is equal to or higher than a DPF recoverable temperature at which the DPF can be recovered, in other words, the temperature at which the particulate matter is burned (S6), the particulate matter in the DPF is spontaneously burned (S7). In other words, the DPF is spontaneously recovered while the engine E continues the normal operation.

On the other hand, when the exhaust gas temperature is lower than the DPF recoverable temperature, the process proceeds to step S8 to determine whether or not the PM amount is equal to or more than an automatic recovery reference amount. When the PM amount is less than the automatic recovery reference amount, the process returns to step S4 where the engine E continues the normal operation.

When it is determined in step S8 that the accumulated PM amount is equal to or more than the reference amount, that is, the PM amount indicates that the DPF is to be recovered, the process proceeds to step S9 to start automatic recovery if the exhaust gas temperature is equal to or higher than the automatic recovery reference temperature (S10).

In this case, the automatic recovery reference temperature refers to a temperature equal to a recoverable temperature minus a temperature to which the exhaust gas temperature can be raised by controlling the engine to the extent that the generator can be used in a manner equivalent to the manner during the normal operation.

In the automatic recovery operation, the engine E is controlled by the engine control unit ECU to the extent that the generator G can be used in a manner similar to the manner during the normal operation, based on the amount of particulate matter (PM amount) measured by the particulate matter amount measuring device PMD provided in the engine E and on the exhaust gas temperature measured by the temperature measuring device TD also provided in the engine E.

Then, the process proceeds to step S11 where the engine E is controlled to burn the particulate matter in the DPF (automatic recovery). The engine control includes post injection (fuel injection during piston exhaust) intake restriction and the like. During the automatic recovery, the engine E is controlled to the extent that the generator can be used in a manner equivalent to the manner during the normal operation.

The process continues the automatic recovery until the PM amount decreases to an automatic recovery end reference amount, while checking whether or not the exhaust gas temperature is equal to or higher than the automatic recovery reference temperature (S11→S12→S13→S11→ . . . ). When, by the automatic recovery, the PM amount decreases below the automatic recovery end reference amount, the automatic recovery ends and the engine E returns to the normal operation (S15→S4).

On the other hand, during an automatic recovery operation, the load may decrease to lower the exhaust gas temperature below the automatic recovery reference temperature. At this time, in other words, when the exhaust gas temperature falls below the automatic recovery reference temperature though the PM amount has not decreased to the automatic recovery end reference (S13), the process suspends the automatic recovery (S14) and proceeds to step S16 to determine whether or not the PM amount is equal to or more than the reference amount at which manual recovery is to be carried out.

When the PM amount is less than the reference amount at which the manual recovery is to be carried out, the process returns to step S4 where the engine E is operated in a normal manner. However, when the PM amount is equal to or more than the manual recovery reference, the process proceeds to step S17 to issue a manual recovery request. When the manual recovery request is issued, the process proceeds to step S18 where the operator performs determination and needed manual operations.

The manual recovery is the last DPF recovery that can be carried out by the engine control, and the manual recovery reference for the PM amount is close to a limit amount at which the DPF can be safely recovered. For the manual recovery, the power output, the rotation speed, and the like need to be adjusted and controlled up to a larger region exceeding the range of the engine control for the automatic control.

This may preclude the generator from performing a normal operation, and thus, power supply needs to be stopped. However, sudden power outage is risky, and the operator's determination and manual operations are involved in the process in order to stop power supply with the usage of the load, the progress of the operation, and the like taken into account. The recovery in this stage is referred to as the "manual recovery", but the recovery operation itself is automatically performed by the engine control apparatus ECU.

First, in step S18, the operator determines whether or not to accept the manual recovery request. If the operator accepts the manual recovery request, the process is manually continued to step S19 where the load on the generator G is cut off, with the engine E kept in an idling state. Then, the operator depresses a manual recovery button (switch) (S20).

Thus, a manual recovery operation is started (S21), and the engine E is controlled to burn the particulate matter (S22). The control is performed until the PM amount decreases down to the manual recovery end reference amount (S23). The control ends when the PM amount reaches the manual recovery end reference amount (S24). The process then returns to step S2.

On the other hand, when the operator determines not to accept the manual recovery request or overlooks the manual recovery request, the process proceeds to step S25 where the engine control unit ECU determines whether or not the PM amount is equal to or more than an emergency stop reference amount. Then, when the PM amount is less than the emergency stop reference amount, the process proceeds to step S4 where the engine E is operated in a normal manner. When the PM amount has reached the emergency stop reference amount, the engine E is brought to an emergency stop (S26) because the particulate matter may be subjected to abnormal combustion to cause an accident.

Figure 4A:
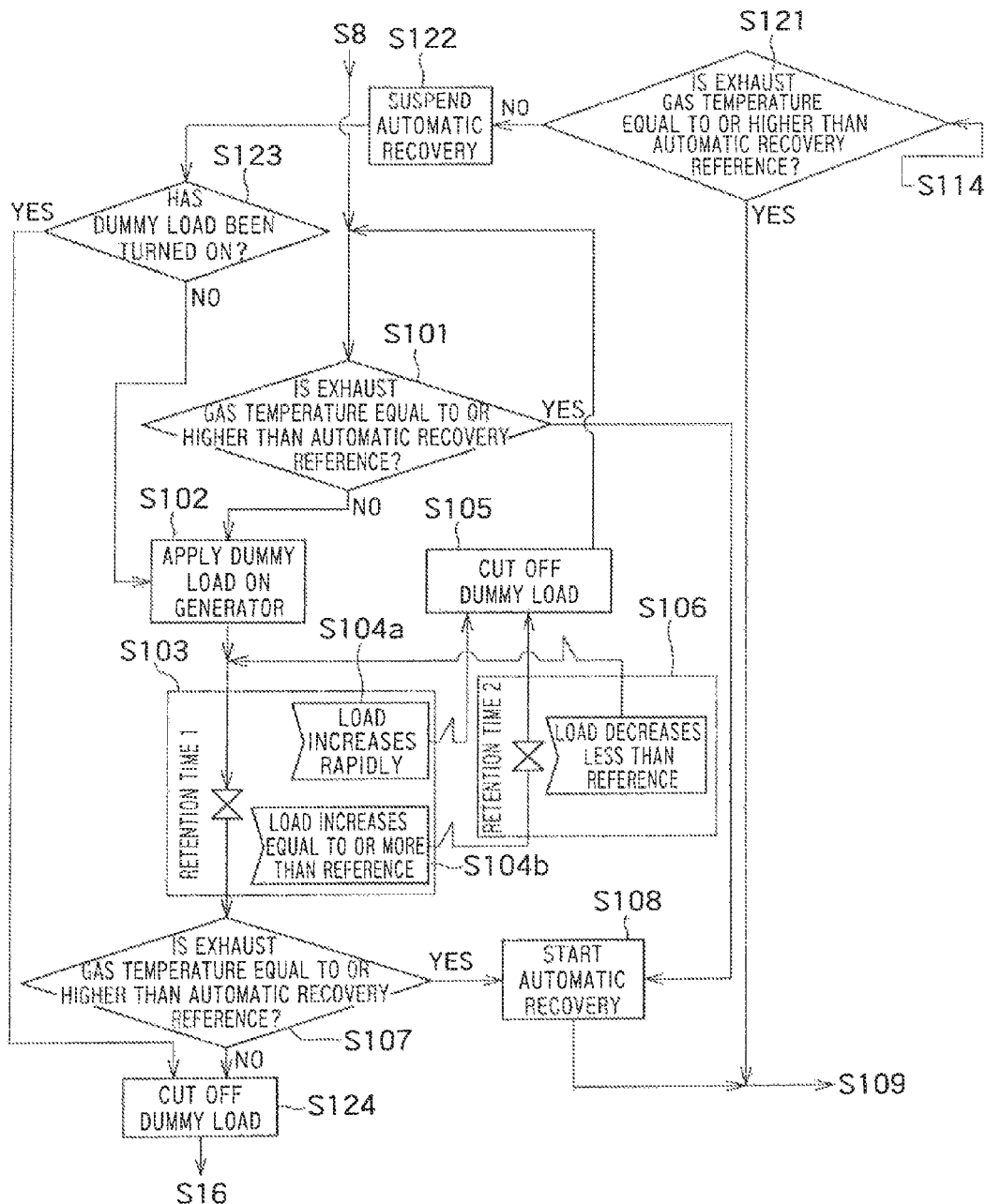
FIG. 4 is a flowchart showing a DPF recovery control operation according to an embodiment of the present invention comprising FIGS. 4A and B.
Figure 4B:
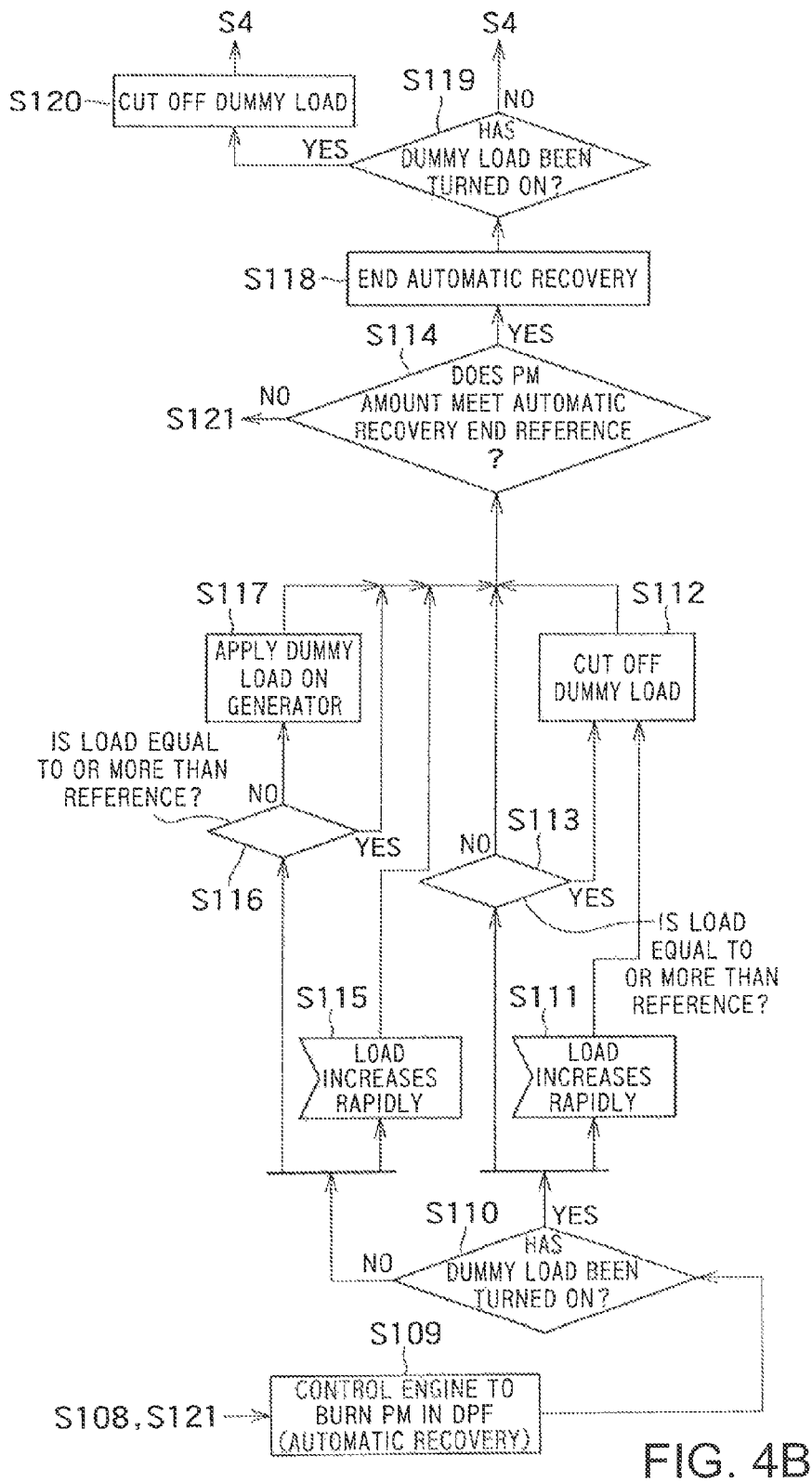

Automatic Recovery Operation by the DPF System According to the Present Invention FIG. 4 is a flowchart illustrating a recovery operation of the system according to the present invention which operation is to be inserted between steps S8 and S17 in FIG. 3 instead of steps S9 to S16 with such expressions as found in activity diagrams.

The flowchart illustrates the contents of an operation by steps S101 to S124, and the description below follows this order of steps.

First, in step S8 in the flowchart in FIG. 3, the process proceeds to step S101 when the PM amount is equal to or more than the automatic recovery reference amount. Step S101 determines whether or not the exhaust gas temperature is equal to or higher than the automatic recovery reference temperature. When the exhaust gas temperature is equal to or higher than the reference temperature, the process proceeds to step S108 to start an automatic recovery operation. When the exhaust gas temperature is lower than the reference temperature, the process proceeds to step S102 where the dummy load L is applied on the generator.

When the dummy load L is applied on the generator, the control unit ECU for the engine E controls the engine E to increase the amount of fuel injection to maintain a constant-speed operation. As a result, the exhaust gas temperature rises, but due to a time delay in the rise of the gas temperature, the result of the operation of the control apparatus appears with the time delay. Therefore, step S103 deals with the time delay using a timer (retention time 1).

That is, when the retention time 1 elapses, determination is made as to whether or not the exhaust gas temperature is equal to or higher than the automatic recovery reference temperature (S107). When it is determined that the exhaust gas temperature is equal to or higher than the automatic recovery reference temperature, the process proceeds to step S108 to start the automatic recovery operation in step S109 and the subsequent steps.

On the other hand, when the exhaust gas temperature is lower than the automatic recovery reference temperature, the process proceeds to step S124 where the dummy load L is cut off, and in step S16, determination is made as to whether or not the PM amount is equal to or higher than the manual recovery reference amount. When the PM amount is less than the manual recovery reference amount, the process returns to step S4 where the engine E is operated in a normal manner. When the PM amount is equal to or more than the manual recovery reference amount, the process proceeds to step S17 to issue a manual recovery request.

The description of the operation returns to step S103. When the load increases rapidly during the set duration for the timer in step 103 (S104a), the process immediately proceeds to step S105 where the dummy load L is cut off. The process then returns to step S101. In this case, the dummy load L is cut off in response to the rapid increase in load in order to provide all of the power supply capability of the engine generator to the load on the assumption that the rapid increase in load is due to, for example, starting of the electric motor. This also applies to a period of an automatic recovery operation described below.

Furthermore, when the load becomes equal to or more than the reference value during the set duration for the timer (S104b), the process proceeds to step S106 where the dummy load L is cut off using another timer (retention time 2) (S105). The process then returns to step S101. Furthermore, when the load becomes less than the reference value during the set duration for another timer, the process returns to step S103 with the dummy load L remaining applied on the generator.

Dummy Load Control During an Automatic Recovery Operation According to the Present Invention When an automatic recovery operation is started in step S108 as described above, the engine E is controlled to burn the particulate matter (automatic recovery) in step S109. The process then proceeds to step S110.

Step S110 determines whether or not the dummy load L is currently applied on the generator. If the dummy load is currently applied on the generator, when the load increases rapidly (S111) or is equal to or more than the reference value (S113), the dummy load L is cut off in step S112.

Furthermore, when, in step S113, the load is less than the reference value, the process proceeds to step S114 to determine whether or not the PM amount has reached the automatic recovery end reference amount. When the PM amount has reached the automatic recovery end reference amount, the automatic recovery ends (S118). On the other hand, when the PM amount is less than the automatic recovery end reference amount, the process proceeds to step S121. Step 121 determines whether or not the exhaust gas temperature is equal to or higher than the automatic recovery reference temperature. When the exhaust gas temperature is equal to or higher than the automatic recovery reference temperature, the process returns to step S109 to continue the automatic recovery operation.

If, in step S110, the dummy load L has not been applied on the generator, when the load increases rapidly (S115) or is equal to or more than the reference value (S116), the process proceeds to S114. Furthermore, when the load is less than the reference value, the dummy load L is applied on the generator (S117) and proceeds to step S114 to determine whether or not the PM amount meets the automatic recovery end reference.

When, in step S114, the PM amount has reached the automatic recovery end reference amount, the process proceeds to step S118 to end the automatic recovery and then proceeds to step S119 to check whether or not the dummy load L has been applied on the generator. When the dummy load L has been applied on the generator, the process proceeds to step S120 to cut off the dummy load L. When the dummy load L has not been applied on the generator, the process returns to step S4 where the engine generator is operated in a normal manner.

On the other hand, when step S114 determines that the PM amount does not meet the automatic recovery end reference, step S121 determines whether or not the exhaust gas temperature is equal to or higher than the automatic recovery reference temperature. When the exhaust gas temperature is lower than the automatic recovery reference temperature, the process temporarily suspends the automatic recovery (S122) and proceeds to step S123 to determine whether or not the dummy load L has been applied on the generator. When the dummy load L has not been applied on the generator, the dummy load L is applied on the generator (S102). When the dummy load has been applied on the generator, (determining the automatic recovery to be no longer effective) the dummy load L is cut off (S124) and proceeds to S17 to issue a manual recovery request.

When, in step S121, the exhaust gas temperature is equal to or higher than the automatic recovery reference temperature, the process proceeds to step S109 to continue the automatic recovery. This is followed by the operation in step S110 and the subsequent steps.

Now, a technical prerequisite for the present invention is that a state is basically avoided in which, even though the dummy load L is applied on the generator (S102) to increase the load on the engine E, the exhaust gas temperature fails to rise and is lower than the automatic recovery reference. Such a state could only occur when there should have been a very abnormal situation such as an extreme decrease in outside temperature to an unexpected value or a failure in mechanical element.

Embodiment 2

Embodiment 1 above is described on the premise that the output power voltage from the generator is fixed. However, given that many generators on the markets are switchable between a three-phase 400 V class and a three-phase 200 V class, the dummy load L is desirably made switchable in response to switching of the voltage.

To achieve this, for example, a voltage detecting relay may be provided in an input section of the dummy load L so as to allow automatic switching of the dummy load L according to the voltage of the generator. In the dummy load L, resistors may be connected to be switchable between a series connection and a parallel connection or between a star connection and a delta connection. When the output power voltage from the generator is high, the connection may be switched to the series connection or the star connection. When the output power voltage from the generator is low, the connection may be switched to the parallel connection or the delta connection.

DESCRIPTION OF SYMBOLS

E Engine
G Generator
DPF Diesel particulate filter
DOC Oxidation catalyst
TD Temperature measuring device
PMD Particulate matter amount measuring device
ECU Engine control unit
G-ECU Engine controlling additional unit
MC Contactor
L Dummy load

What is claimed is:

1. A Diesel Particulate Filter (DPF) recovery system for an engine which drives a generator, having a particulate matter amount measuring device which detects an amount of particulate matter attached to the DPF, and a temperature measuring device which detects a temperature of exhaust gas of the engine so as to carry out a recovery process of the DPF to remove the particulate matter generated by combustion of fuel for the engine when the amount of the particulate matter attached to the DPF exceeds a predetermined value, by performing an automatic recovery operation to raise the temperature of the exhaust gas so as to burn the particulate matter, the DPF recovery system comprising:

a dummy load connectable to the generator; and a control device, including an engine control unit and an engine controlling additional unit, for allowing the engine to perform the automatic recovery operation by cooperation of the engine control unit and the engine controlling additional unit according to detected signals from the particulate matter amount measuring device and from the temperature measuring device;

the control device operates the engine in such a manner that, when the amount of the particulate matter exceeds the predetermined value, the control device immediately allows the automatic recovery operation when the temperature of the exhaust gas reaches an automatic recovery reference temperature, and the control device connects the dummy load to the generator when the temperature of the exhaust gas does not reach the automatic recovery reference temperature to raise the temperature of the exhaust gas so as to carry out the automatic recovery operation;

wherein the control device further comprises: a first timer for setting a retention time which is required for raising the temperature of the exhaust gas to reach the automatic recovery reference temperature since connecting the dummy load, and the control device judges whether the temperature of the exhaust gas exceeds the automatic recovery reference temperature, carries out the automatic recovery operation immediately when the temperature of the exhaust gas exceeds the automatic recovery reference temperature, connects the dummy load to the generator when the temperature of the exhaust gas does not exceed the automatic recovery reference temperature, judges whether the temperature of the exhaust gas exceeds the automatic recovery reference temperature after the retention time of the first timer has passed, carries out the automatic recovery operation when the temperature of the exhaust gas exceeds the automatic recovery reference temperature, disconnects the dummy load when the temperature of the exhaust gas does not exceed the automatic recovery reference temperature, and judges whether the amount of the particulate matter exceeds a manual recovery reference amount, so as to generate a manual recovery request if the amount of the particulate matter exceeds the manual recovery reference amount, or to carry out a normal operation of the engine if the amount of the particulate matter does not exceed the manual recovery reference amount.

2. The DPF recovery system for the engine according to claim 1, wherein the control device comprises:

a second timer for producing an output, when a predetermined time for disconnecting the dummy load has passed, the control device measures amount of the load of the generator, judges whether the amount of the load exceeds a manual recovery reference load, disconnects the dummy load when the load of the generator does not exceed the reference load but increases rapidly, disconnects the dummy load after the retention time of the second timer has passed when the load of the generator does not exceed the reference load but increases rapidly, does not disconnect the dummy load and returns to a state after connecting the dummy load when the load of the generator decreases below the reference load during the retention time of the second timer.

3. The DPF recovery system for the engine according to claim 1, wherein the control device:

measures an amount of the load connected to the generator, judges whether the amount of the load of the generator exceeds a predetermined reference value, in the case the dummy load is connected under the automatic recovery operation disconnects the dummy load when the amount of the load of the generator exceeds the predetermined reference value, or when the amount of the load of the generator does not exceed the reference value but increases rapidly, in the case the dummy load is not connected under the automatic recovery operation, connects the dummy loud when the load of the generator does not exceed the reference value, measures the amount of the particulate matter, terminates the automatic recover operation if the reference for ending the automatic recovery operation is satisfied, measures the temperature of the exhaust gas by the temperature measuring device, continuously carries out the automatic recovery operation when the temperature of the exhaust gas exceeds the automatic recovery reference temperature, judges whether the dummy load is connected, and connects the dummy load if disconnected so as to restart preparation for the automatic recovery operation.

4. The DPF recovery system for the engine according to claim 1, wherein the control device judges whether the dummy load is connected to the generator after terminating the automatic recovery operation, and disconnects the dummy load if the dummy load is connected.

5. The DPF recovery system for the engine according to claim 1, wherein the dummy load is built to be switchable in relation to the output voltage of the generator.

* * * * *